W. C. PLANK.
MOTION PICTURE MACHINE.
APPLICATION FILED NOV. 13, 1919.
1,366,488.
Patented Jan. 25, 1921.
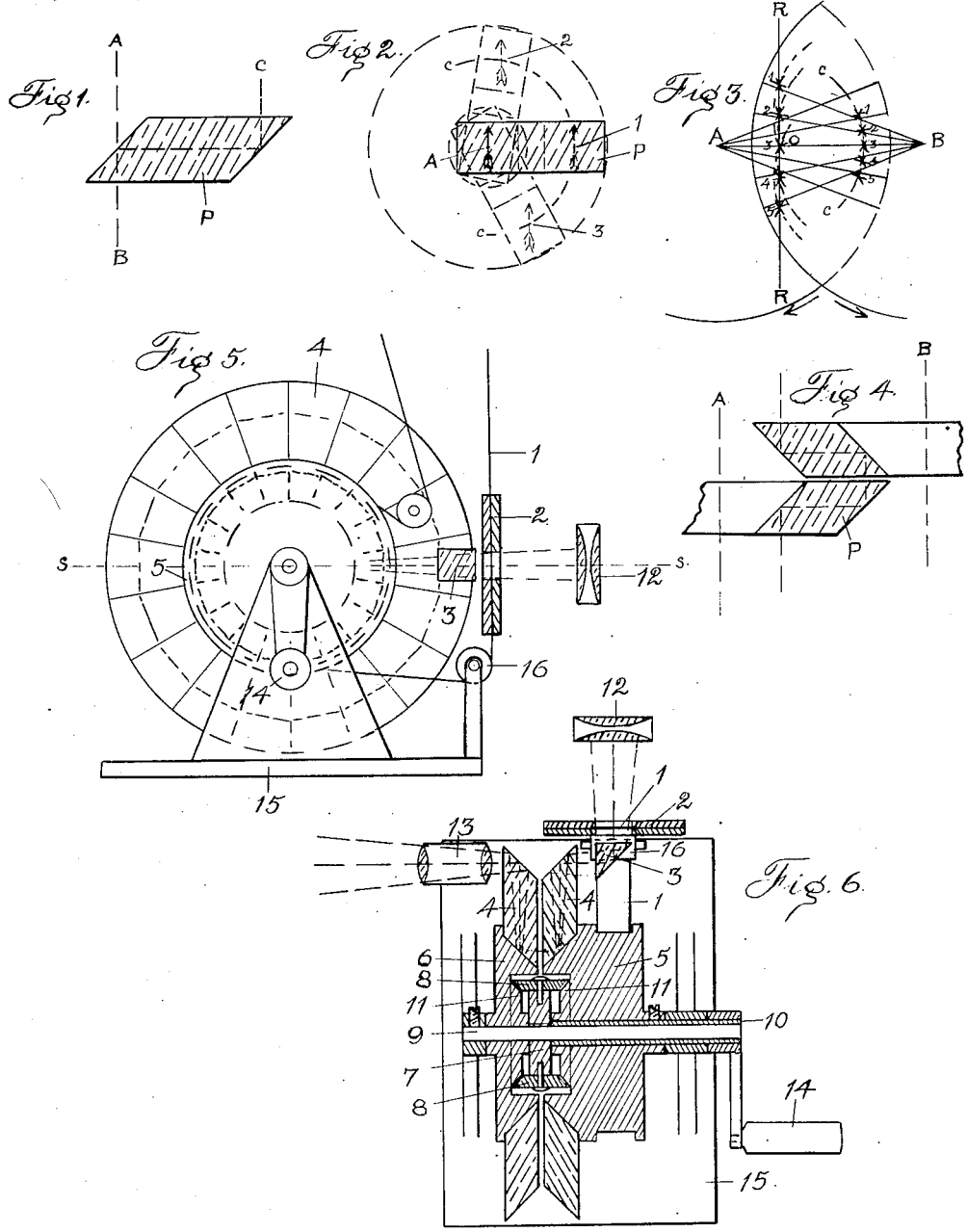
WITNESSES
INVENTOR
Wm C Plank

UNITED STATES PATENT OFFICE.

WILLIAM CHARLES PLANK, OF SAN JOSE, CALIFORNIA.

MOTION-PICTURE MACHINE.

1,366,488.   Specification of Letters Patent.   Patented Jan. 25, 1921.

Application filed November 13, 1919. Serial No. 337,714.

*To all whom it may concern:*

Be it known that I, WILLIAM CHARLES PLANK, a citizen of the United States, residing at San Jose, in the county of Santa Clara and State of California, have invented new and useful Improvements in Motion-Picture Machines, of which the following is a specification.

The present invention relates to improvements in motion picture machines in which the film moves through the light beam in a continuous manner and in which movable optical rectifying means are employed to hold the projected image arrested upon the screen.

Several such continuous motion cinematographs have been constructed and although the linear motion of the film can be completely compensated for by them and the projected image held arrested upon the screen, still movements will occur within the arrested image itself that cause distortions, due to moving reflectors varying the focus, or to refractive effects in rotating prisms, caused by varying thicknesses of glass being interposed to the light rays. These distorting effects present the most serious obstacle to a successful continuous motion cinematograph as they invariably cause blurring in the projected image however perfectly the linear motion of the film be compensated for.

The object of the present improvement is to compensate for the movement of the film by means of reflecting prisms revolving in such a manner through the light beam that the focus will be maintained constant and the thickness of glass through which the light rays pass will be always uniform.

In the accompanying drawing Figures 1, 2, 3 and 4 are diagraphic sketches illustrating the principle upon which the invention operates. Fig. 5 is a rear elevation of a machine embodying the invention and Fig. 6 is a sectional plan view of the same machine along the line S—S of Fig. 5.

A double reflecting prism P, Fig. 1, of a rhomboidal shape and having two opposed reflecting surfaces, when rotated about the axis A—B will show an object at B moving in a circular path when viewed from C. The reflected image although revolving around the axis A, dose not rotate about its own axis, but is maintained in a constant relative position.

This property is illustrated in Fig. 2, where the object, an arrow, at the axis A is reflected at 1, and by rotating the prism P, at 2 and 3, the reflected arrows always remain parallel with the object at A although moving around on the arc C—C.

In applying this principle in a motion picture machine to compensate for the movement of the film, the curved path followed by the reflected image must be compensated for and the image made to follow a rectilinear path.

This is accomplished by means of a second prism similar to the first but revolving in an opposite direction at the same velocity. Fig. 3 illustrates how this is accomplished. As the first prism rotates around the axis A in the direction shown by the arrow, the object at O is reflected at the points 1 to 5 on the arc C—C. A second prism revolving in the opposite direction around the axis B, and arranged over the first prism as shown in cross section at Fig. 4, will reflect the image from the positions 1 to 5 on the curved path C—C to the positions 1 to 5 on the rectilinear path R—R, and at the same time increase the travel of the reflected object.

Conversely, an object moving along the rectilinear path R—R from positions 1 to 5, may be reflected to the positions 1 to 5 on the curved path C—C by the rotation of the prism around the axis B, and then brought to a stationary position at the point O by the rotation of the other prism in an opposite direction around the axis A. In this manner an image on a film moving along a rectilinear path may be made to appear stationary. The diagrams show two prisms rotating around two different axes, but the same result is obtained when they are rotated in opposite directions around a common axis, as they are designed to operate in Fig. 6.

In Fig. 6, 5 is the film driving drum which is turned by means of the handle 14 and the hollow shaft 10. A circle of double reflecting prisms 4, fitted contiguous to each other, are mounted upon the same drum and revolve with it when it rotates. A second rotary member 6 also carrying a series of similar prisms 4, is rotatably mounted upon the fixed shaft 9. Both the drum 5 and the member 6 have the bevel gears 11 attached to them which are adapted to be engaged with the beveled pinions 8 mounted upon the stud 7 which is keyed to the fixed shaft 9.

By this means the prisms of the member 6 are made to revolve in the opposite direction to the prisms of the drum 5, when the latter is rotated, both series of prisms revolving at the same velocity.

No. 1 is the film, 2 is the film gate having an aperture through which the light rays from the condenser lens 12 pass to the stationary right angle prism 3 which deflects them to the prisms 4 on the drum 5, where they are twice reflected before passing to the prisms 4 of the member 6. From these the rays pass to the objective lens 13. The film is given a turn around the idler drum 16 whose position is adjustable so as to properly "mask" the pictures.

The prisms 4 Fig. 5, are contiguously mounted around the drum, so the inner part of the prisms are necessarily narrower than the outer part. In order to make the light beam conform to the shape of the prisms optical means are provided to make the light rays cross at a point in between the two series of prisms, as shown in Fig. 6. By this means the light rays converge within the prisms mounted on the drum 5 and diverge within the prisms of the member 6, the prisms thus being able to contain all the light rays falling upon the outer surface of the prisms on the drum.

I claim:

1. In a motion picture machine using a continuously moving film, a compensating element comprising two opposed parallel reflecting surfaces and means for revolving the said reflecting surfaces around a common axis at different distances from the said axis.

2. In a motion picture machine using a continuously moving film, a series of compensating elements each comprising two opposed parallel reflecting surfaces, a rotary member upon which the said compensating elements are radially disposed so that one of the said reflecting surfaces of each element will describe a greater circle than the other when revolved around on the said rotary member.

3. In a motion picture machine using a continuously moving film, a compensating element comprising two opposed reflecting surfaces parallel with each other, means for revolving the said two reflecting surfaces around an axis in a common plane perpendicular to the said axis, a second compensating element similar to the first and means for revolving the said second element in an opposed direction to increase the compensating effect of the first element.

4. In a motion picture machine using a continuously moving film, a compensating element comprising a rhomboidal shaped prism having two opposed reflecting surfaces revolving around an axis in the same plane, a second compensating element similar to the first, revolving in an opposed direction, adapted to correct the curvature of the path followed by the image in the first compensating element.

5. In a motion picture machine using a continuously moving film, a reflecting element comprising a rhomboidal shaped prism having two opposed reflecting surfaces, means for revolving the said reflecting surfaces around an axis in the same perpendicular plane, whereby the reflected image is made to follow a curved path, a second reflecting element similar to the first but revolving in the opposite direction, adapted to correct the curvature of the path followed by the image in the first reflecting element and make the reflected image follow a rectilinear path, at a uniform velocity.

6. In a motion picture machine using a continuously moving film, a reflecting element comprising a rhomboidal shaped prism having two opposed reflecting surfaces, means for revolving the said two reflecting surfaces around an axis in a common plane perpendicular to the said axis, whereby the reflected image of a stationary object is made to move in a curved path; a second reflecting element similar to the first, means for revolving the second element in an opposed direction to the first element whereby the reflected image is made to move at an increased velocity and along a rectilinear path.

7. In a motion picture machine using a continuously moving film, a series of compensating elements each comprising a rhomboidal shaped prism having two opposed reflecting surfaces, a rotary member upon which the said prisms are radially disposed so that one of the reflecting surfaces of each prism will describe a greater circle than the other when revolved, a second series of compensating elements similar to the first, mounted upon a second rotary member and revolving in the opposite direction, adapted to increase the compensating effect of the first series of compensating elements and correct the curvature of the path followed by the reflected image.

8. In a motion picture machine using a continuously moving film, a series of compensating elements each comprising a rhomboidal shaped prism having two opposed reflecting surfaces, a rotary member upon which the said prisms are radially disposed, means for rotating the said member so as to make the prisms successively traverse the light beam in relation with the movement of the film, whereby the images on the film are reflected to follow a curved path and their velocity reduced; a second series of similar compensating elements similarly mounted upon a second rotary member, means for successively revolving the second series of prisms through the light beam at the same velocity, but in an opposite direction to the first series of prisms, to completely compensate for the movement of the film and make the reflected image stationary.

9. In a motion picture machine using a continuously moving film, a rotary member, a series of rhomboidal shaped prisms having two opposed reflecting surfaces, radially disposed around such member, contiguous to each other, whereby the inner ends of such prisms are narrower than the outer ends; a second similar rotary member carrying similar prisms, revolving in the opposite direction to the first member, means for revolving the two series of prisms through the light beam in relation with the movement of the film, and optical means to make the light rays cross at a point so the light rays will converge or diverge when passing through the said series of prisms, to make the light beam conform to the shape of the said prisms.

10. In a motion picture machine using a continuously moving film, the combination of, a film driving drum, a series of rhomboidal shaped double reflecting prisms attached to said drum, a second rotary member rotatably mounted upon a fixed shaft and carrying a similar series of prisms, a hollow shaft fitting over part of the fixed shaft adapted to turn the film driving drum, a stud keyed to the fixed shaft carrying two bevel gear pinions adapted to engage bevel gears cut on the said film driving drum and said other rotary member, whereby when the prisms on the drum are made to revolve in one direction the prisms mounted on the other rotary member are made to revolve in the opposite direction, at the same velocity, a stationary right angle prism adapted to reflect the rays passing through the gate to the prisms on the drum, an idler pulley adjustably mounted adapted to mask the pictures, means for turning the hollow shaft to rotate the film driving drum, and an objective lens situated in front of the rotary members carrying the said rhomboidal shaped prisms.

Signed by me at San Jose, California, this seventh day of November, 1919.

WILLIAM CHARLES PLANK.

Witnesses:
    Archer Bowden,
    C. R. Plank.